United States Patent Office 3,406,151
Patented Oct. 15, 1968

3,406,151
PROCESS FOR THE PREPARATION OF ACETYLATED HIGH MOLECULAR WEIGHT POLYOXYMETHYLENES
Kurt Klinkmann, Monheim, and Karl-Ludwig Schmidt, Opladen, Germany, assignors to Farbenfabriken Bayer Aktiengesellschaft, Leverkusen, Germany, a German corporation
No Drawing. Filed July 21, 1964, Ser. No. 384,244
Claims priority, application Germany, Aug. 16, 1963, F 40,507
3 Claims. (Cl. 260—67)

ABSTRACT OF THE DISCLOSURE

Acetylation of high molecular weight polyoxymethylenes and copolymers thereof employing an inert organic solvent having a boiling point less than that of acetic anhydride for the purpose of producing colorless, thermally stable products.

Polyoxymethylenes prepared by polymerisation of monomeric formaldehyde or trioxane contain terminal hydroxyl groups in the linear polymer chain. The high molecular weight polyoxymethylenes are broken down to a large extent from these ends by thermal or chemical action. The high molecular polyoxymethylenes must therefore be stabilized by blocking the hydroxyl groups.

This blocking may be effected inter alia by acylation, especially acetylation of the end groups in such a way that the physical properties of the polymers are preserved.

Acetylation is usually carried out with a large excess of acetic anhydride in order to obtain a suspension which can be stirred. The acetylation temperature employed usually lies between 100 and 150° C., preferably at the boiling temperature of acetic anhydride (139° C.). A considerable number of catalysts have been proposed for accelerating the reaction, e.g. tertiary amines and sodium acetate.

It has now been found that, depending on which acetylating catalyst is used, a more or less strong discolouration of the motor liquor occurs during acetylation. However, this discolouration is not confined to the mother liquor; the acetylated polyoxymethylenes also have a more or less dark discolouration when the reaction is finished, and this discolouration cannot be removed by washing. This discolouration which inhibits the use of the acetylated polyoxymethylenes also has an adverse effect on the thermostability.

A process was therefore developed according to one of our own earlier proposals, in which the acetylation was carried out under extractive conditions, i.e. a portion of the acetic anhydride is continuously removed from the reaction zone during the acetylation and replaced by fresh acetic anhydride. In this process the amount of acetic anhydride used is much larger than in the conventional process. Therefore, the used acetic anhydride must be worked up and reused. Acetylated polyoxymethylenes having a considerably improved thermostability are thereby obtained. But these products are still not satisfactory with regard to colour.

Object of the present invention is a process, wherein completely colourless acetylated polyoxymethylenes are obtained, which are thermally stable.

In the process according to the invention, a certain quantity of a low boiling point inert solvent is added to the starting components on the acetylation reaction. The reaction temperature which is preferably the boiling temperature of the mixture is thereby lowered to about 115 to 130° C. However, the desired effect cannot be achieved merely by lowering the temperature without adding inert solvent.

Suitable for use as low boiling inert solvents are, for example, low boiling ketones, esters or ethers, e.g. acetone, methylethylketone, ethyl acetate, butyl acetate or dipropylether. The solvents are added in a quantity such that a boiling point between 115 and 135° C., preferably 120 to 130° C. is established under reflux conditions. The amount of solvent added is preferably between 3 and 10% by weight based on acetic anhydride, most preferably 6 to 8% by weight. The acetylation may be carried out with the possible addition of catalyst such as sodium acetate, either batchwise or under extractive conditions. In the latter case, care must be taken to ensure that the low boiling point solvent carried away with the acetic anhydride used up is replaced by fresh solvent so that a constant concentration is maintained.

The acetic anhydride used for the acetylation should be as pure as possible, such as at least 99.5% pure. It may be advisable first to distill the acetic anhydride over potassium permanganate. This slightly diminishes the discolouration reactions from the start.

The acetylation time is 3 to 15 hours.

Example 1

50 parts by weight of high molecular polyoxymethylene with an intrinsic viscosity of 1.1, obtained by Sn-II-catalysis, are suspended in 500 parts by weight of acetic anhydride (99.6%). 35 parts by weight of acetone and 0.4 g. of sodium acetate are added to the suspension and the whole mixture is heated at reflux temperature for 15 hours, with stirring. An internal temperature of 125° C. is established in the reaction vessel during this time. At the end of the reaction time, the mother liquor is slightly pale yellow. Molten acetylated polyoxymethylene that has been worked up in known manner is pure white.

In a test carried out for comparison, which was carried out as above and at a reaction temperature of 125° C. but without using acetone, the mother liquor was brown-red. A molten sample of the worked up acetylated polyoxymethylene was slightly yellowy brown in colour.

Example 2

Acetylation was carried out as in Example 1 except that 35 parts by weight of ethyl acetate were added instead of the acetone. A temperature of 128° C. becomes established in the reaction vessel. At the end of the reaction, the mother liquor is slightly discoloured yellow. A molten sample of the worked up acetylated polyoxymethylene is pure white in colour.

What is claimed is:
1. In the process of producing acetylated high molecular weight polyoxymethylenes and copolymers thereof by acetylating polyoxymethylenes or copolymers thereof having terminal hydroxyl groups with acetic anhydride, the improvement which comprises effecting acetylation under reflux conditions at a temperature between 115 and 135° C. in the presence of from 3 to 10% by weight, based on the weight of acetic anhydride, of an inert organic solvent having a boiling point below that of acetic anhydride and selected from the group consisting of ketones, esters and ethers.

2. The process of claim 1 wherein the inert organic solvent is a member selected from the group consisting of acetone, methylethylketone, ethyl acetate, butyl acetate and dipropylether.

3. The process of claim 1 wherein the inert organic solvent is a member selected from the group consisting of ethyl acetate and acetone.

References Cited

UNITED STATES PATENTS 2,998,409  8/1961  Dal Nogare et al. _____ 260—67

WILLIAM H. SHORT, *Primary Examiner.*

L. M. PHYNES, *Assistant Examiner.*